Dec. 20, 1955  C. GOHL  2,727,451
AUTOMATIC VINEYARD PLOW
Filed Oct. 3, 1952  2 Sheets-Sheet 1
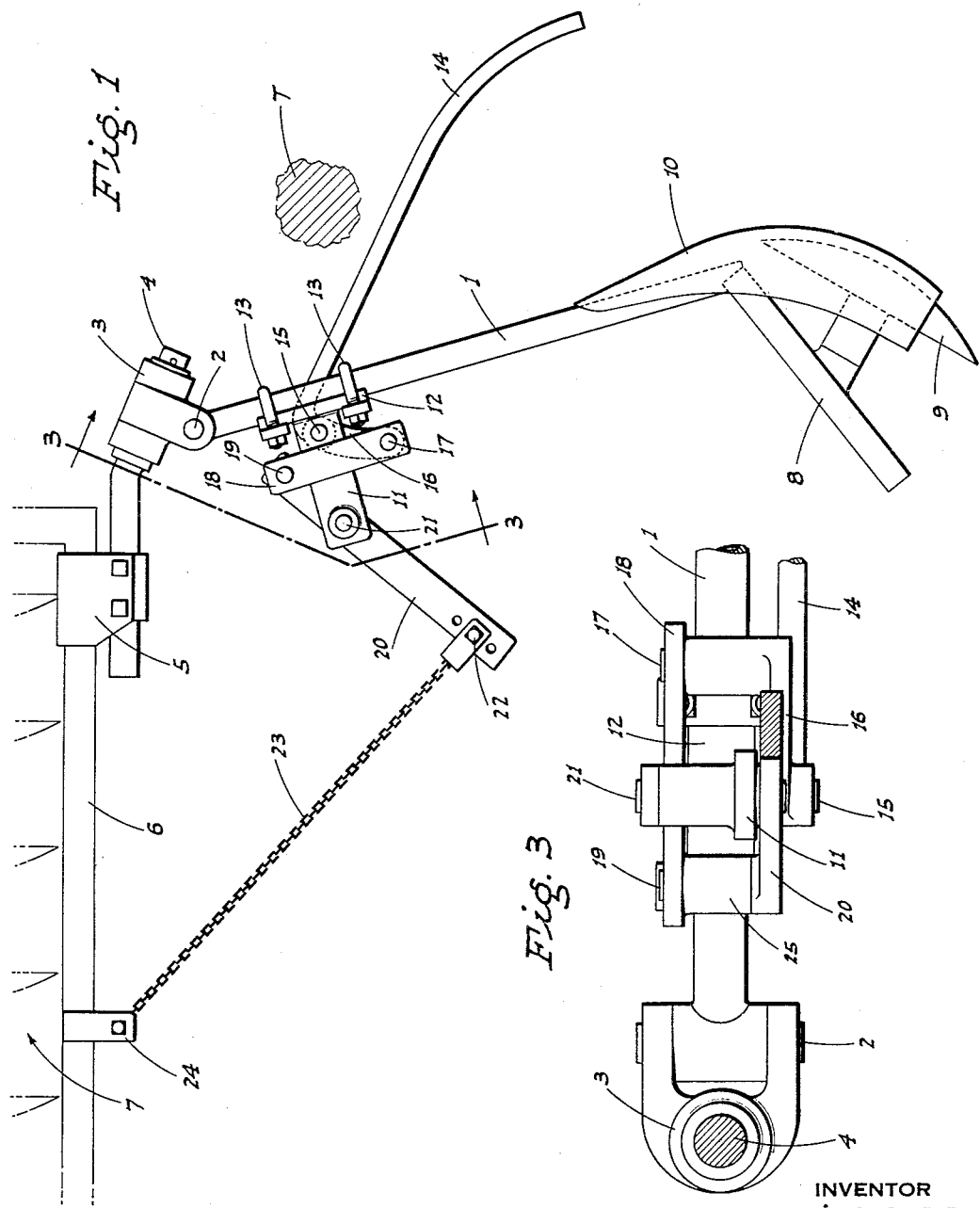
INVENTOR
Christ Gohl
BY
ATTYS Dec. 20, 1955
C. GOHL
2,727,451
AUTOMATIC VINEYARD PLOW
Filed Oct. 3, 1952
2 Sheets-Sheet 2
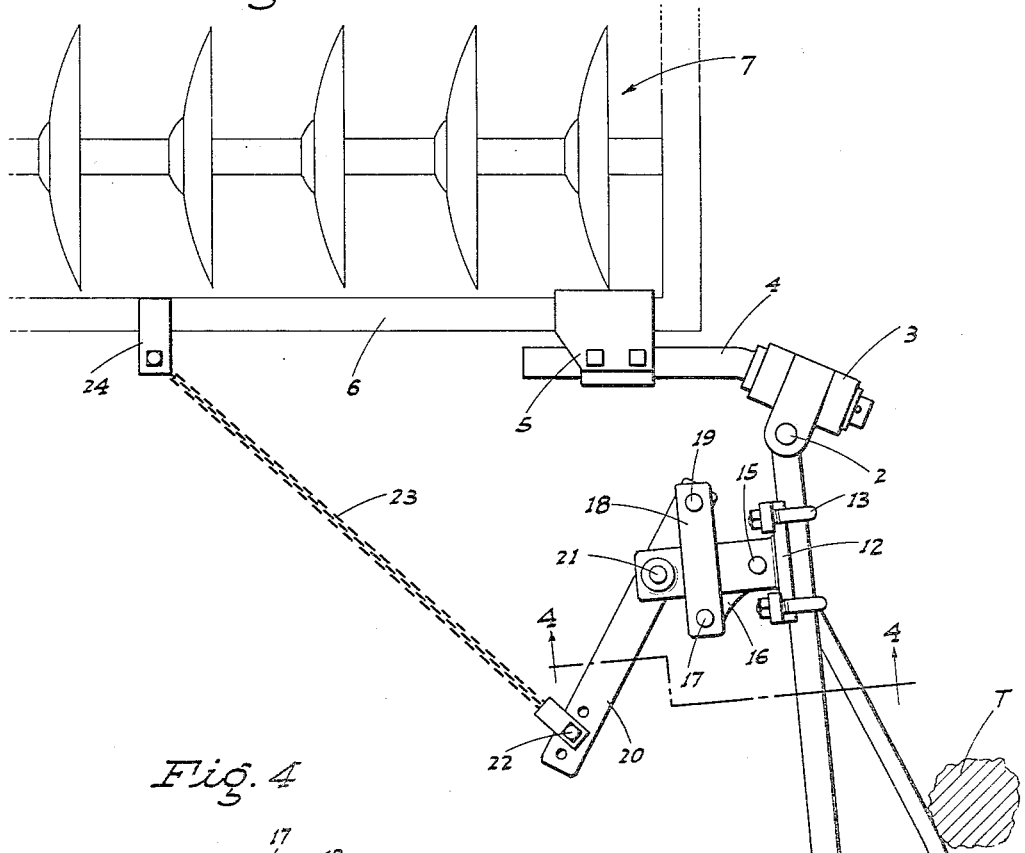
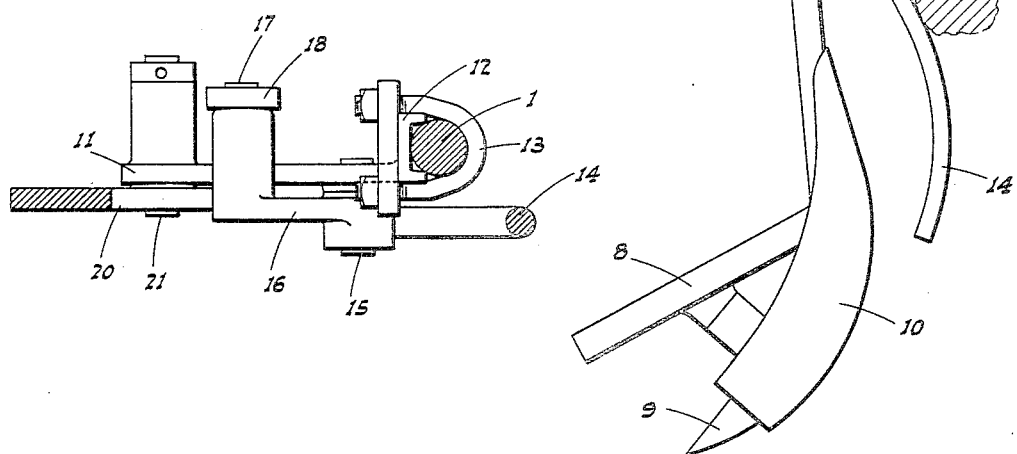
INVENTOR
*Christ Gohl*
BY
*Webster* ATTYS

United States Patent Office 2,727,451
Patented Dec. 20, 1955

2,727,451

AUTOMATIC VINEYARD PLOW

Christ Gohl, Lodi, Calif., assignor to Christ Gohl & Son, Lodi, Calif., a partnership Application October 3, 1952, Serial No. 312,969

2 Claims. (Cl. 97—46.89)

This invention relates to vineyard or orchard plows such as are used to plow or cultivate the ground directly between adjacent vines of a row, at the same time that the ground between adjacent rows, as a whole, is being worked by an ordinary disc gang or the like.

The vineyard plow must, of course, move clear of each vine as it is approached by the plowing element, and includes a vine engaging bar.

The major object of this invention is to provide a means between such bar and the plow structure, and acting on the latter with each vine contact, which will cause said structure to be automatically shifted laterally so as to move the plow member away from the vines as they are successively passed, and which is so arranged that great leverage is exerted on the structure to so shift it, and thus minimizing the pressure exerted against the vine itself.

A further object is to provide a structure for the purpose which will reset itself without the need of any springs or the like.

Still another object of the invention is to provide an automatic vineyard plow which is practical, reliable, and durable, and one which is exceedingly effective for the purpose for which it is designed.

These objects are accomplished by means of such structure and relative arrangement of parts as will fully appear by a perusal of the following specification and claims.

In the drawings:

Fig. 1 is a top plan view of the improved vineyard plow disposed in its plowing position.

Fig. 2 is a similar view, showing the plow member retracted to clear a vine being passed.

Fig. 3 is a fragmentary enlarged sectional elevation on line 3—3 of Fig. 1.

Fig. 4 is a fragmentary enlarged cross section on line 4—4 of Fig. 2.

Referring now more particularly to the characters of reference on the drawings, the plow structure comprises a substantially horizontal plow beam 1, vertically pivoted at its forward end, as at 2, on a sleeve 3 swivelly mounted on a transversely extending supporting bar 4. This bar, laterally in from the sleeve, is mounted in a bracket 5 adapted to be rigidly secured to the rear frame member 6 of a tractor-pulled disc gang 7 or similar plowing or cultivating unit, adjacent the laterally outer side of said unit. Of course, the bracket 5 may be mounted directly on a transverse tool-bar, or the like, if such plow unit 7 is not employed.

Beam 1, at its rear end, is provided with a preferably weighted extension 8 projecting diagonally and laterally in from beam 1, and which supports a disc 9 or similar plowing member which is disposed at a suitable operating angle to the line of movement of the structure, and which tends, of itself, to shift laterally out and to swing beam 1 in a similar direction about pivot 2. In order to prevent contact of the upper portion of the disc with depending vine branches, or the like, the upper portion of the disc is covered by a hood 10 secured on the beam 1.

A plate-like bracket 11 projects laterally in from the beam 1 a short distance from its forward end, this bracket being rigid with a support 12 adjustable along and normally rigidly clamped against beam 1 by clamping bolts 13. A feeler bar and actuating lever 14 projects rearwardly from under beam 1 and bracket 11 in normally diverging relation to the beam 1 to a rearward termination laterally out a considerable distance beyond disc 9, so as to be in the path of a vine trunk T which would otherwise be struck by said disc with the travel of the structure along the row of vines. Bar 14 is pivoted, at its forward end, on the bracket 11 adjacent the beam 1, as at 15, and is formed with a relatively short arm 16 projecting rearwardly from the pivot.

At its rear end, arm 16 is pivoted, as at 17, on the rear end of a forwardly projecting link 18, which is substantially parallel to beam 1. This link crosses bracket 11 and is pivoted at its forward end, as at 19, on the forward end of a lever type link 20. Link 20 is pivoted on bracket 11, as at 21, at a point intermediate the ends of said link relatively close to pivot 19, as shown, and so that the distance between pivots 21 and 19 is the same as between pivots 15 and 17. Link 20 extends diagonally in a laterally inward direction from its forward end, and adjacent its rear end is adjustably connected, as at 22, to the rear end of an anchor or tension chain or similar member 23 which, at its forward end, is rigidly connected to the rear beam 6 of unit 7, as at 24, preferably at a point substantialy centrally of the width of said unit.

In operation, because of the angle of disc 9 relative to the line of travel, said disc tends to move laterally out, swinging the beam 1 about pivot 2. This places chain 23 under tension and link 20 is, therefore, swung to shift lever 14 laterally out, by reason of the connecting arms and linkage between said lever and the link 20. Such outward movement of lever 14—and the beam 1 also— is limited by the engagement of a boss 25 on link 18 with the forward side of bracket 11; said boss depending from said link about the pivot pin 19, as plainly shown in Fig. 3.

Also, when this occurs, link 18 approaches a position in which any tendency to further rearward movement thereof will not exert further rotative action on arm 16 about its pivot 15, as will be clear from Fig. 1.

Disc 9 is then positioned to work between the vines of a row, and lever 14 extends across the line of such row, so as to be engaged by each trunk T as the plow structure is drawn along, as shown in Fig. 1.

When lever 14 engages trunk T, said lever swings about pivot 15, swinging arm 16, which is rigid with said lever, laterally inward as well as forwardly.

Link 18, to which arm 16 is pivoted, is also shifted laterally relative to bracket 11, and the forward movement thereof is transmitted to lever 20 to swing the same about its pivot 21. However, since the rear end of the lever 20 is connected to the non-extensible chain 23, said lever cannot freely swing about said pivot, and, as a result, with the rear end of the lever being held substantially stationary, bracket 11, together with beam 1 and parts attached thereto, are pulled laterally inward, the beam 1 swinging about pivot 2 to the position shown in Fig. 2.

The disc 9 is thus moved laterally inward so that it clears the trunk T, and remains in this position until the lever 14 moves ahead of the trunk. The disc 9 is then released to shift out to its initial position, which, through the anchored link 20 and connections, causes lever 14 to be swung out to its initial position, ready for another trunk-engaging action.

Adjustment of the bracket 11 along beam 1, or adjustment of the point of connection of the chain with link 20, or in the length of the chain, or adjustment of bar 4 in bracket 5, enables the working position of beam 1 and disc 9 to be altered relative to the unit 7 as may be found best for any particular working conditions.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An automatic vineyard plow comprising a plow beam adapted to project rearwardly from a draft element, means to vertically pivot the beam at its forward end in connection with such element, a plow mounted on the rear end of the beam and tending to move laterally out with the beam upon forward movement thereof, a bracket on the beam intermediate its ends, a vine-trunk contacting lever pivoted at its forward end on the bracket and extending laterally out therefrom at a rearwardly diverging angle thereto, a link pivoted intermediate its ends on the bracket and extending rearwardly from its pivot laterally inward from the beam, a tension element swivelly connected to and extending between the rear end of the link and the draft element laterally in from the beam pivot, and elements connected between the forward end of the link and the lever to cause said forward end to be shifted laterally inward so as to pull the beam laterally inward upon swinging movement of the lever toward the beam; the bracket projects laterally inward from the beam and the link is pivoted on the bracket laterally in from the pivot of the lever; said connecting elements comprising a relatively short arm rigid with the lever and extending rearwardly from the pivot thereof, and another link extending between and pivotally connected to the rear end of said arm and the forward end of the first named link.

2. A structure as in claim 1, in which said other link extends in a direction lengthwise of the beam and in crossing relation to the bracket, with a member on said other link forming a stop to engage the bracket to limit the movement of such link in a direction to increase the angle of divergence of the lever beyond a predetermined normal.

References Cited in the file of this patent

UNITED STATES PATENTS 2,606,488     Kanawyer et al. _____ Aug. 12, 1952

FOREIGN PATENTS 653,752     France _____ Nov. 19, 1928